United States Patent
Benkert et al.

(10) Patent No.: US 9,882,966 B2
(45) Date of Patent: Jan. 30, 2018

(54) METHOD FOR PROVIDING DATA FOR A MOBILE DEVICE FROM A FIELD DEVICE, COMPUTER PROGRAM AND ARRANGEMENT FOR EXECUTING SAME

(71) Applicant: Endress + Hauser Conducta Gesellschaft für Mess- und Regeltechnik mbH + Co. KG, Gerlingen (DE)

(72) Inventors: Tilman Benkert, Stuttgart (DE); Bjorn Haase, Stuttgart (DE); Gunter Jahl, Lochgau (DE); Stefan Robl, Hunxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 834 days.

(21) Appl. No.: 14/464,062

(22) Filed: Aug. 20, 2014

(65) Prior Publication Data
US 2015/0058738 A1 Feb. 26, 2015

(30) Foreign Application Priority Data
Aug. 26, 2013 (DE) .................... 10 2013 109 213

(51) Int. Cl.
*G06F 3/048* (2013.01)
*H04L 29/08* (2006.01)
(Continued)

(52) U.S. Cl.
CPC ............ *H04L 67/10* (2013.01); *G06F 3/0482* (2013.01); *H04W 4/00* (2013.01); *H04W 8/08* (2013.01); *H04W 4/008* (2013.01)

(58) Field of Classification Search
CPC ........ G06F 3/0482; G06F 15/16; G06F 13/36; G06F 11/00; H04L 67/10; H04W 8/08
See application file for complete search history.

(56) References Cited

U.S. PATENT DOCUMENTS 7,447,803 B2 * 11/2008 Thoren .................. H03M 7/30
709/246
8,155,761 B2 4/2012 Felts
(Continued)

FOREIGN PATENT DOCUMENTS

| CN | 102385323 A | 3/2012 |
|---|---|---|
| CN | 102402214 A | 4/2012 |

(Continued)

OTHER PUBLICATIONS

German Search Report, German PTO, Munich, dated Mar. 31, 2014.

*Primary Examiner* — Rashawn Tillery
(74) *Attorney, Agent, or Firm* — Christopher R. Powers; PatServe

(57) ABSTRACT

A method for providing static data and dynamic data of a service/display menu for a mobile device from a field device. The field device contains identification data, and, associated therewith, a total amount of static data and dynamic data. Upon query of the mobile device, dynamic data and/or static data are transmitted with a data transmission rate from the field device to the mobile device via a wireless interface. Static data required for application, especially for representation, and/or changing of transmitted dynamic data are transmitted from the field device to the mobile device, when the static data corresponding to the identification data are not already present in the mobile device; wherein these static data make up only a portion of the total amount of static data in the field device, so that an application, especially a representation, and/or changing of the transmitted dynamic data by the mobile device is enabled with the portion of the static data; and wherein these static data are stored in a memory in the mobile device. A computer program for performing the method is disclosed, (Continued)

US 9,882,966 B2

Page 2 and an arrangement comprising a field device and a mobile device for performing the method.

15 Claims, 4 Drawing Sheets

(51) Int. Cl.
    *G06F 3/0482*     (2013.01)
    *H04W 8/08*     (2009.01)
    *H04W 4/00*     (2009.01)

(56) References Cited

U.S. PATENT DOCUMENTS

| | | |
|---|---|---|
| 8,249,726 B2 | 8/2012 | Krumsiek |
| 2004/0168053 A1* | 8/2004 | Kaszkin ............ G05B 19/0428 713/153 |
| 2007/0096244 A1* | 5/2007 | Roth ................ G05B 19/0423 257/478 |
| 2010/0114334 A1 | 5/2010 | Krumsiek |
| 2011/0239109 A1* | 9/2011 | Nixon ................ G06F 17/2247 715/236 |
| 2011/0302511 A1* | 12/2011 | Chomik ............. G05B 19/4186 715/760 |
| 2012/0054599 A1* | 3/2012 | Nixon ................ G05B 19/4183 715/236 |
| 2012/0062577 A1* | 3/2012 | Nixon ................ G05B 23/0272 345/522 |
| 2012/0166609 A1* | 6/2012 | Lux ...................... G05B 19/042 709/223 |
| 2012/0182119 A1* | 7/2012 | Vetter ................... H04W 4/008 340/4.3 |
| 2013/0031249 A1* | 1/2013 | Gunzert ............... G05B 19/042 709/224 |
| 2015/0180972 A1* | 6/2015 | Wentland ............ G06F 3/04817 715/738 |

FOREIGN PATENT DOCUMENTS

| | | |
|---|---|---|
| CN | 102474514 A | 5/2012 |
| CN | 102902243 A | 1/2013 |
| DE | 102008055660 A1 | 5/2010 |
| DE | 102009011552 A1 | 9/2010 |
| DE | 102011053124 A1 | 1/2012 |
| DE | 102010042999 A1 | 5/2012 |
| JP | 2000158296 A | 6/2000 |
| WO | 2010099859 A1 | 9/2010 |

* cited by examiner

METHOD FOR PROVIDING DATA FOR A MOBILE DEVICE FROM A FIELD DEVICE, COMPUTER PROGRAM AND ARRANGEMENT FOR EXECUTING SAME

TECHNICAL FIELD

The invention relates to a method for providing static data and dynamic data of a service/display menu for a mobile device from a field device of process automation. The invention relates further to a computer program for performing this method. The invention relates, moreover, to an arrangement comprising a field device and a mobile device for performing the method.

BACKGROUND DISCUSSION

A field device of process automation is frequently serviced from a remote control room, i.e. parameters of the field device are set from a remote location. Such a situation arises e.g. when the field device has no on-site display unit, or because the user is not located on-site in the plant. German Patent DE 10 2010 029 655 describes the application of a web server in the field device.

The terminology "parameter" means, in such case, an actuating or influencing variable, which acts on the field device and, thus, changes the behavior of the field device or delivers information concerning the state of the field device. A nonexclusive list of parameters includes, in such case, measurement frequency, measurement time, measured value, calibration point in time, output signal, supplied energy, etc.

It can, however, be desired to service the field device on-site. For example, the changing of a parameter of the field device should be directly observed and performed by a user at the measuring point, for example, the field device is to be calibrated.

The adjusting of settings in the field device can, in such case, be effected, for example, by means of a mobile device. Such a mobile device includes a display unit, on which a service/display menu is presented. Via the service/display menu, settings can be effected in the field device or information can be downloaded from the field device. As a rule, service/display menus are hierarchically structured, in order to facilitate for the user the finding of the desired information.

Known from the state of the art are mobile devices, which can be connected to the field device directly by means of a cable or to a fieldbus, which, in turn, is connected with the field device. In the second case, the mobile device is connected indirectly with the field device. However, in process automation, field devices are frequently installed in difficultly reachable locations.

The state of the art also contains mobile devices with wireless connections for configuring field devices, for instance, the device "Field Xpert" of the group of firms, Endress+Hauser.

A problem, which arises especially in the case of bus-fed field devices, especially in the case of two conductor devices, is that the energy available in the field device limited. Since, most often, a high data transmission rate is accompanied by a high energy consumption, only a smaller data transmission rate can be implemented.

Even when enough energy is available for the field devices (for instance, through the application of four conductor devices or two conductor devices with external energy supply), a maximal data transmission rate is opposed by several factors, especially under process conditions, i.e. the specific conditions of process automation. Among these factors are distance from the hotspot (thus the source), number of clients (i.e. users of the wireless network), application of older standards, losses through disturbances, geometry of the antenna, unfavorable arrangement in a factory building, taking into consideration standards and guidelines (e.g. the ATEX guidelines), etc.

The FDT/DTM concept is frequently used in process automation. These acronyms stand for field device tool and device type manager. A DTM is, in principle, a driver. The DTM includes all functions, the structure, the parametering and the graphical user interface, including a help system for the field device or, possibly, the entire device family. In order that all DTMs of different manufacturers function correctly, the interfaces to the surrounding systems as well as to other DTMs must be clearly defined. An FDT is such an interface definition. An example of an FDT is the program "FieldCare" of the group of firms, Endress+Hauser. In order that a mobile device connected with a field device can correctly change parameters of the field device, it is necessary always to have the complete driver (DTM) including service/display menu on the mobile device. Since different field devices have different DTMs and different firmware versions of the field devices require possibly different DTMs, many different versions must be earlier stored in the mobile device. Also, frequently the particular firmware version of the field device is not known or is only known directly on-site. In the case of the DTM concept, one is limited to one platform (Windows, since version 2.0 via .net)

Also, an adjusting of the field device is possible via the Device Description Language (DDL). Via a corresponding Device Description (DD), some (standard) parameters of the field device can be changed. Also, a DD must be earlier installed. The DD must be interpreted by a suitable software tool, wherein different interpreters must be specifically programmed.

SUMMARY OF THE INVENTION

An object of the invention is to enable the servicing and display of a field device through a mobile device under process conditions.

The object is achieved by a method, a computer program and an arrangement.

As concerns the method, the object is achieved by a method for providing static data and dynamic data of a service/display menu for a mobile device from a field device of process automation; wherein the field device contains identification data, especially field device type and firmware version, and, associated therewith, a total amount of static data and dynamic data; wherein, upon query of the mobile device, dynamic data and/or static data are transmitted with a data transmission rate from the field device to the mobile device via a wireless interface, especially via Bluetooth or WLAN, especially according to a standard of the IEEE 802.11 family; wherein static data required for application, especially for representation, and/or changing of transmitted dynamic data are transmitted from the field device to the mobile device, when the static data corresponding to the identification data are not already present in the mobile device; wherein these static data make up only a portion of the total amount of static data in the field device; so that an application, especially a representation, and/or changing of the transmitted dynamic data by the mobile device is enabled with the portion of the static data, wherein these static data are stored in a memory in the mobile device.

From reasons already given above a relatively low data transmission rate, for instance, under 100 kbit/s, especially under 50 kbit/s, especially under 16 kbit/s, can result for the transmission of the static and dynamic data. For a resource saving transmission, always only that part of the static data is transmitted, which is exactly required. If the data are already in the mobile device, such can be re-accessed. For field devices with the same identification data, i.e. equal type and firmware version, these already present static data can likewise be used and, thus, a renewed transmission prevented.

Upon the first connection between the field device and the mobile device, the main menu is transmitted. Every other page navigated to from there is transmitted upon request. At the beginning, no data are located in the mobile device.

In contrast to the mentioned DTM/FDT concept, already after just a portion of the static data has been stored in the mobile device, a representation and/or change of the transmitted dynamic data by the mobile device is possible.

In a preferred embodiment, the static data concern data that does not vary, e.g. the structure, especially hierarchical structure, of a service/display menu embodied for servicing the field device, visibility of the service/display menu, value ranges of parameters, dependencies of parameters, texts of the service/display menu in at least one standard language, especially texts of the service/display menu in English, and/or visibility of parameters, especially as a function of the field device and/or as a function of hardware connected to the field device.

In an additional preferred embodiment, the dynamic data concern measured values and these are displayed on the mobile device, and/or the dynamic data concern parameters and these are displayed on the mobile device, changed and/or transmitted back to the field device for the purpose of changing settings of the field device. The "parameters" concern thus actuating or influencing variables, which act on the field device.

Preferably, a point-to-point connection is established between the field device and the mobile device.

In an advantageous further development, at least the dynamic data are transmitted by means of a binary communication protocol. In this way, additionally, the data transmission rate can be better utilized, since binary protocols have in general a higher data density than, for instance, text-based protocols, such as HTTP.

If the total amount of the static data is available to the mobile device, then all service and display functions of the field device can be utilized by the mobile device. For downloading the total amount of the static data to the mobile device, different options are available to the user, as set forth below.

Advantageously, other static data different from the static data already transmitted are transmitted by the field device to the mobile device in the background in the case of a not fully utilized data transmission rate. Thus, it is possible to transmit to the mobile device the total amount of static data stored in the field device without explicitly accessing all parts of the service/display menu. In this way, the speed of menu navigation can be increased, since the probability of the presence of the required static data automatically increases with the duration of the connection.

Furthermore, it is advantageous, when, especially after an initial connection between field device and mobile device, other static data of the total amount of static data still lacking are downloaded to the mobile device from another device, especially a network server, via a second wireless interface, especially via a mobile radio connection or per WLAN, especially according to a standard of the IEEE 802.11 family, or via a mobile data carrier, especially a USB flash memory or an SD card. This provides a fast and simple opportunity for downloading the total amount of static data to the mobile device, to the extent that a fast data connection is present. The data can also be drawn, for instance, from the Internet or an intranet.

Additionally, preferably expanded media contents, such as texts of the service/display menu in additional languages, operating instructions, photos and/or videos are transferred to the mobile device via the second wireless interface or the mobile data carrier. The user, thus, has more options available to receive information concerning the field device than would be practical via a transmission of the data from the field device alone.

Since the field device has only limited computing power, the visual representation of the service/display menu is preferably left to the mobile device. On the mobile device, the received data are presented according to the native view of the operating system of the mobile device. This is in contrast to a web server implementation, where the web server must "know" the kind of device making the request and have ready a corresponding representation; thus, for instance, for a large tablet (e.g. 10") another representation is required than for a smart phone (e.g. 5") or an industrial PDA (possibly even without a presentation using color).

In an advantageous embodiment, additional data are sent by the field device to the mobile device and displayed on the mobile device, independently of the static data and dynamic data currently displayed on the mobile device, when parameter and/or measured values assume certain values. Thus, for instance, a warning report can be displayed on the mobile device, when parameter and/or measured values are outside of an allowed value range. Additionally, a state machine (finite automaton, finite state machine) can be implemented, for instance, for the menu controlled calibrating of the field device. The additional data can, for instance, also be static and dynamic data.

The object is further achieved by a computer program, which has software means, which serve for performing a method according to at least one of the above described embodiments, wherein the computer program is executed in a field device and/or a mobile device. Parts of the computer program are, in such case, executed in the mobile device, for instance, as an application, i.e. a so-called app. Other parts are executed in the field device, for instance, in software or, in given cases, also in firmware.

The object is further achieved by an arrangement comprising at least one field device and at least one mobile device for performing a method according to at least one of the above described embodiments.

In an embodiment, an option is that a plurality of field devices "connect" with a mobile device in broadcast mode. In this case, the mobile device receives a limited amount of data from the field device without establishment of a direct connection (thus in contrast to the above described establishment of a direct connection). In such case, e.g. only identification or device type as well as measured values or even only the main measured value are transmitted.

Preferably, the field device has a connection to a fieldbus, especially based on HART, wireless HART, PROFIBUS PA, PROFINET, ModBus, FOUNDATION Fieldbus or EtherNet/IP, and/or the field device has a 4 . . . 20 mA interface. It is, thus, possible, that the field device is connected directly to a control room.

In an embodiment, it is provided that the field device and the mobile device for changing parameters are always connected with one another, i.e. are online.

In an advantageous embodiment, the field device is a two conductor device. Without limitation, the invention can also apply to four conductor devices, wherein then, according to definition, more energy is available. Then, higher transmission rates are possible.

In an additional advantageous form of embodiment, the field device is embodied for use at least according to Ex ib.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
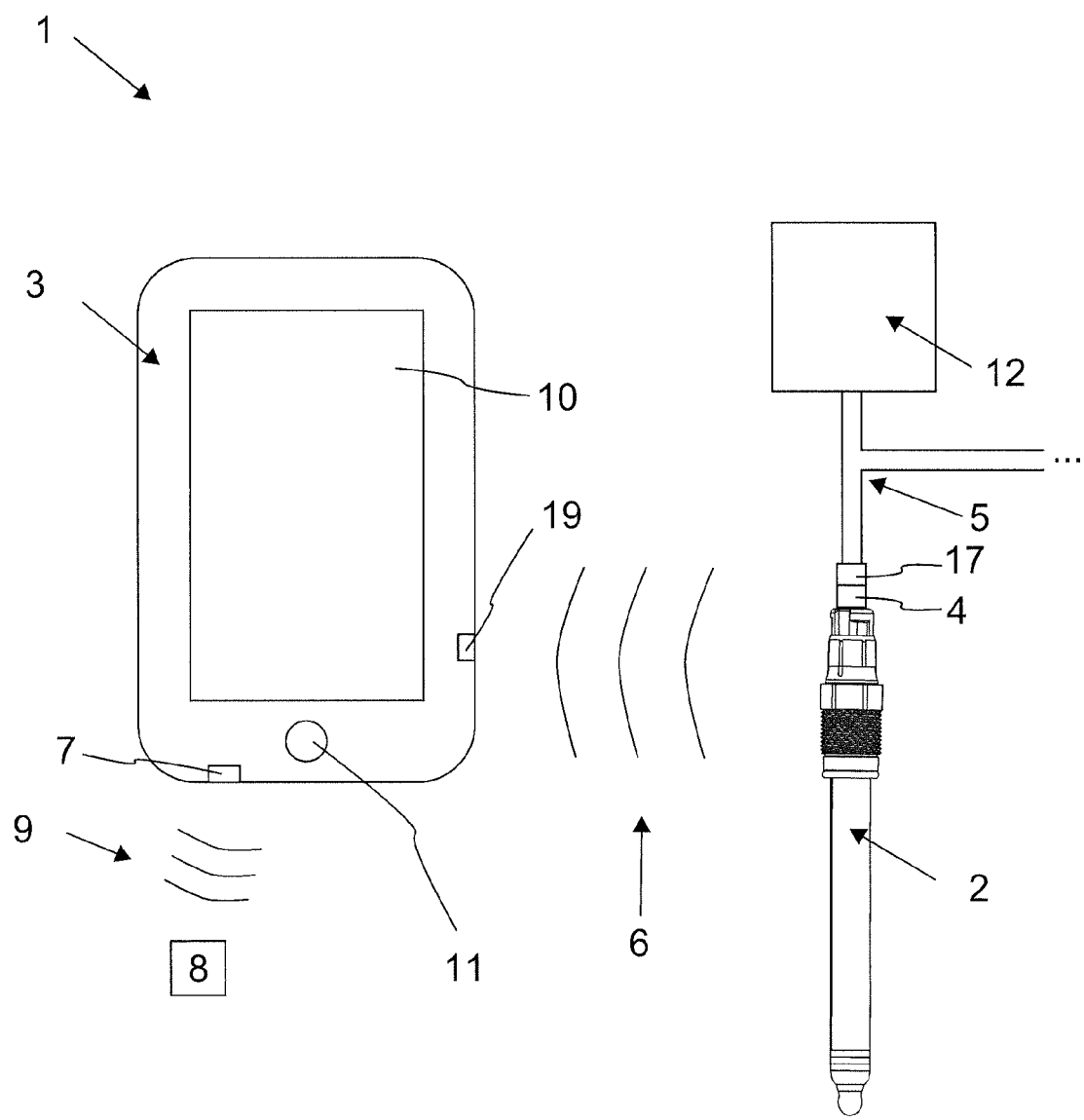
FIG. 1 an arrangement of the invention.

In the figures, equal features are provided with equal reference characters.

The arrangement of the invention in its totality bears the reference character 1 and is presented in FIG. 1.

Figure 2:
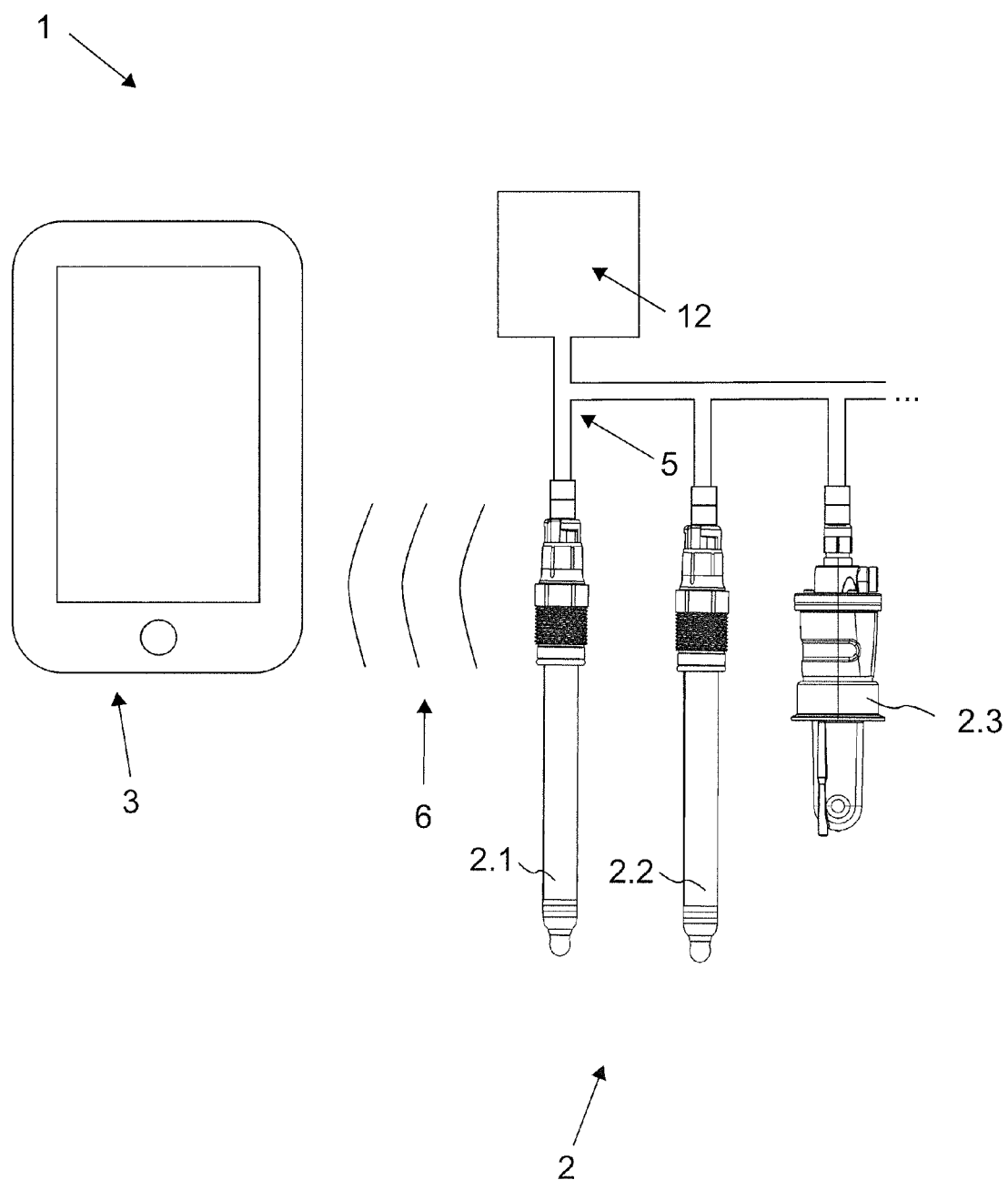
FIG. 2 an arrangement of the invention in an embodiment.

Arrangement 1 comprises as main components the mobile device 3 and the field device 2. FIG. 1 shows a single field device 2. FIG. 2 shows an arrangement 1 with three field devices 2.1, 2.2 and 2.3 (see details below). The one or more field devices 2 are connected via a fieldbus interface 17 with a fieldbus 5 and therewith directly with a control room 12. Fieldbus 5 can be one of the fieldbusses, HART, wireless HART, PROFIBUS PA, PROFINET, ModBus, FOUNDATION Fieldbus or EtherNet/IP. Alternatively or supplementally, the field devices 2 can have a 4 . . . 20 mA interface (not shown).

Field device 2 has a wireless interface 4. Mobile device 3 has a matching wireless interface 19. The wireless connection 6 is, in such case, a WLAN connection, especially according to a standard of the IEEE 802.11 family, or a Bluetooth connection. In the case of Bluetooth, preferably Bluetooth of the newest generation, especially Bluetooth 4.0, also known as Bluetooth Low Energy (LE), is used.

Field device 2 is a field device of process automation, thus, for instance, a sensor or an actuator. In the example in FIGS. 1 and 2, pH, respectively conductivity, sensors are shown. Other typical sensors include redox-potential, also ISFET, temperature, oxygen, especially dissolved oxygen, and carbon dioxide sensors; ion-selective sensors; optical sensors, especially turbidity sensors, sensors for optically determining oxygen concentration, and sensors for determining number of cells and cell structures; sensors for monitoring certain organic or metal compounds; sensors for determining concentration of a chemical substance, for example, a certain element or a certain compound; and biosensors, e.g. glucose sensors.

The mobile device 3 is, for instance, a mobile telephone, smart phone, tablet, Personal Digital Assistant (PDA). Alternatively, a portable computer, notebook, sub-notebook, netbook or desk note can be used. As a special alternative, an industrial PDA is used. This is obtainable in an Ex model, for instance, from Endress+Hauser under the designation "Field Xpert SFX370". The terminology, Ex model, means here, for instance, ignition protection type "II 2G Ex is IIC T4 Gb IP64", and the like.

Mobile device 3 includes a display 10 and interaction elements 11. Modern mobile devices 3 are equipped with a touch screen, so that servicing occurs directly via the display 10.

Field device 2 is embodied, for instance, as a two conductor device. The terminology, two conductor devices, refers to devices, in the case of which energy supply and data communication occur over the same two lines. Inherently, field devices of this type have a limited energy budget. Additionally, the field device 2 can be applicable at least according to Ex ib, especially also in zone 2 according to ATEX guidelines. To meet this standard, special electrical protection and energy saving measures are required, so that, in given cases, even less energy is available.

Established between mobile device 3 and field device 2 is a point-to-point connection. Located in the mobile device 3 is an app, while the field device 2 carries a corresponding computer program. These are suitable for performing the subsequently described method and are executed in the mobile device 3, respectively in the field device 2. See also FIG. 3 in this connection.

In a first step, the field device 2 transmits its identification data, especially the field device type (e.g. pH-sensor) and the version of the firmware (e.g. v1). Field device 2 contains additional static data 13 and dynamic data 14. Mobile device 3 checks whether a connection to a field device with these identification data was ever produced in the past.

Figure 4:
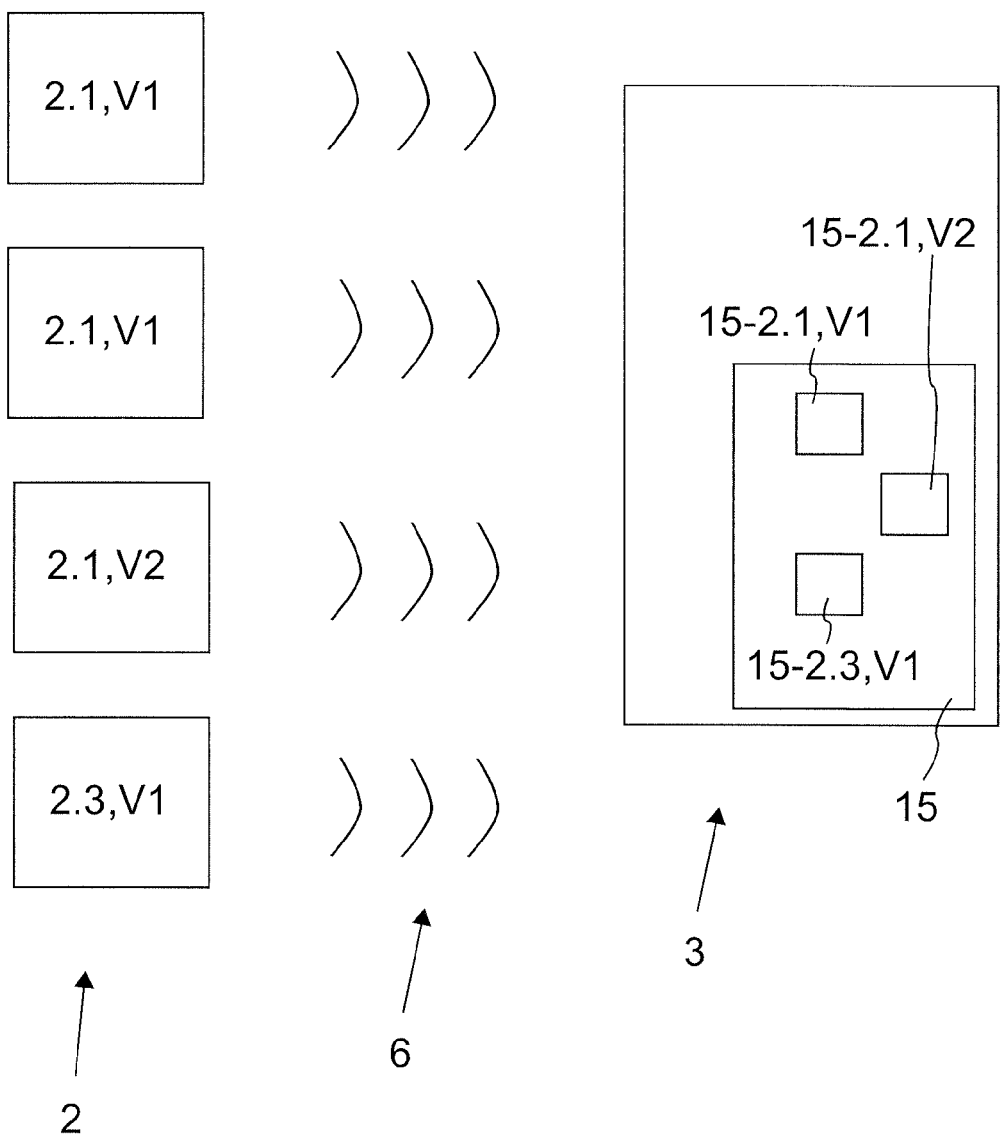
FIG. 4 is a schematic presentation of the memory of an arrangement of the invention.

If a connection to a field device with these identification data has yet to be produced, the field device 2 transmits those static data 13 and dynamic data 14, which are to be used at the moment, especially presented at the moment. The data transmitted are thus limited to those, which are currently exactly necessary. The static data are stored in a memory 15 of the mobile device 3 for later use. Thus, the static data 13 are transmitted only once from the field device 2 to the mobile device 3. Field devices with same identification data can use the static data 13 already located in the memory 15. FIG. 4 makes this clear: shown on the left side of FIG. 4 are four field devices 2; two of type 2.1 with firmware version V1, one of type 2.1 with firmware version V2 and one of type 2.3 with firmware version V1. Necessary in memory 15 are only three regions, since the two field devices with the same identification data can use the same memory location 15-2.1,V1. Also, the device types with the same firmware versions (here thus 2.1,V1 and 2.3,V1) can use a partially shared memory. This is indicated in FIG. 4 by showing the memory locations 15-2.1,V1 and 15-2.3,V1 at the same vertical height.

If the required static data 13 were already download once, then no renewed transmission is required.

As already mentioned, only those data are downloaded, which are to be used, especially displayed, at the moment. At the beginning, this is thus the main menu of the service/display menu. During navigating through the service/display menu, then always exactly the menu to be displayed at the moment is transmitted.

The static data 13 includes the (hierarchical) structure of the service/display menu, visibility of the service/display menu, value ranges of parameters, dependencies of parameters, texts of the service/display menu in at least one standard language, especially texts of the service/display menu in English, and/or visibility of parameters, especially as a function of the field device and/or as a function of hardware connected to the field device.

The dynamic data 14 includes measured values, which then are displayed with the assistance of the corresponding static data. The dynamic data includes also parameters of the field device 3. These are displayed on the mobile device 2, changed and/or transmitted back to the field device 2 for the purpose of changing settings of the field device 2.

For example, static data include a formatting description for representing a measured value. The measured values are themselves dynamic data.

It is possible that the mobile device 2 logs in to the field device 3 as an "observer" (according to the design pattern, publish-subscribe) and a possible change of the measured value is reported. In general, the observed object (here thus the measured value) offers a mechanism for logging the observer in and out and for informing the observer of changes. Each change is reported completely nonspecifically to each logged in observer. Although theoretically possible, it is most practical when only a single mobile device 2 logs in to a field device 3.

A servicing of the field device 3 or the displaying of data on the mobile device 2 is possible only after a portion of the total static data is in the mobile device 2. In this example, it suffices for the display of the measured value on the mobile device to have the corresponding static data in the memory 15. Other static data, such as, for instance, for configuring the field device are not necessary for such purpose.

Depending on the process and industrial conditions, the limited available energy, distance from the source, number of clients, etc., the connection 6 can be a relatively slow connection, for example, below 16 kbit/s. In order to work as resource savingly as possible, the transmission protocol is embodied as a binary protocol. Especially, the dynamic data 14 are transmitted by means of a binary protocol.

If the maximum data transmission rate is not fully utilized at the moment, the part of the static data completing the total amount of static data can be download from the field device in the background.

Modern mobile devices have, besides the mentioned first wireless connection 19, most often, yet a second wireless interface 7, via which a second communication 9 is possible. Compare also FIG. 3 in this connection. Second wireless interface 7 can be, for instance, a mobile radio connection (EDGE, GPRS, UMTS, LTE, etc.) or a WLAN interface. In an embodiment, the first wireless interface 19 is the same as the second wireless interface 7. Via this second interface 7, the static data can be downloaded from another device, for instance, a network server 8. Alternatively, the static data 13 can be transferred to the mobile device 3 from a mobile data carrier, such as a USB flash memory or an SD card.

Via this interface, also expanded media information, such as texts of the service/display menu in additional languages, operating instructions, photos and/or videos can be transmitted to the mobile device 3.

Figure 3:
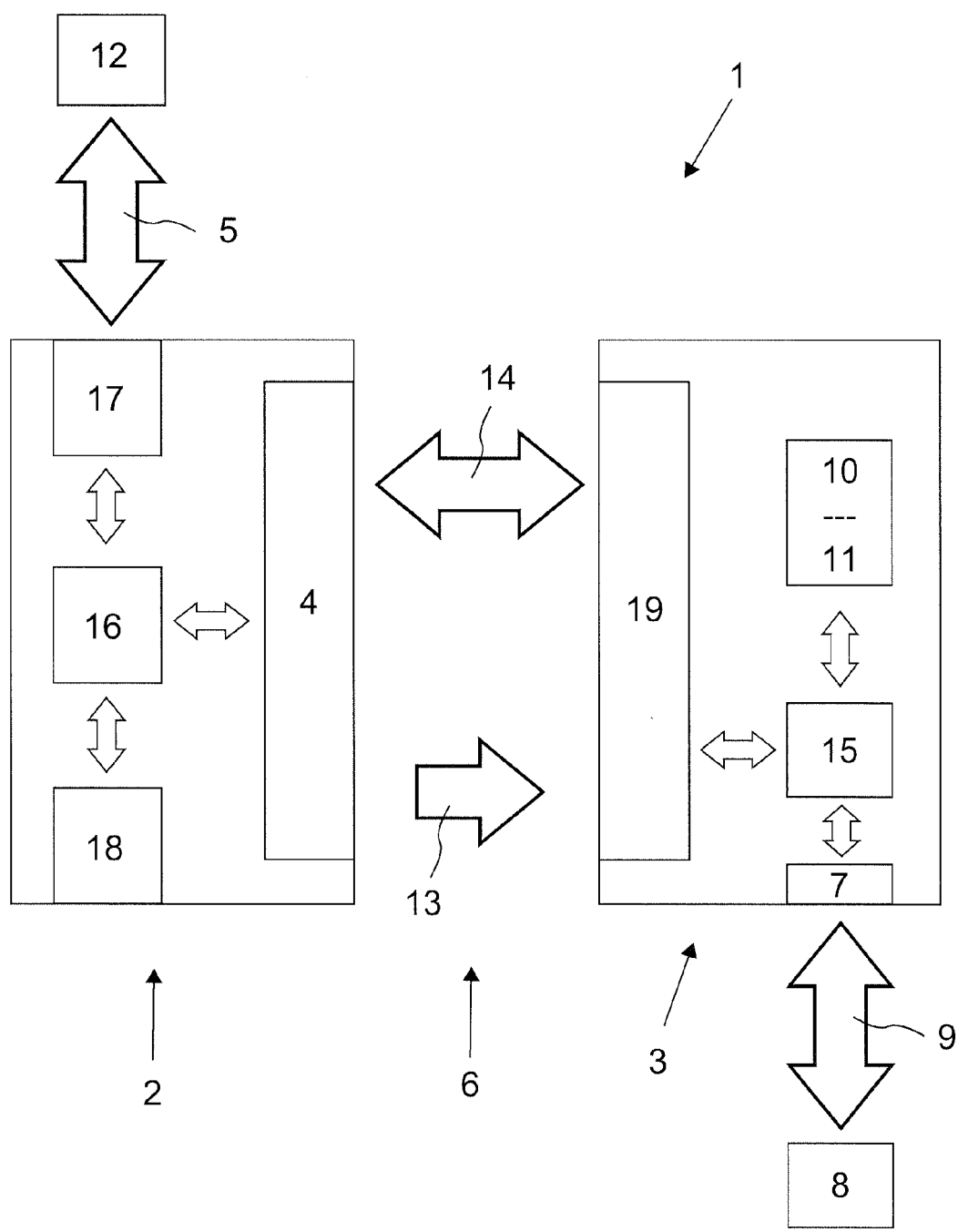
FIG. 3 is a schematic presentation of the arrangement of the invention.

Further evident in FIG. 3 is that the static data 13 are stored in the field device 2 in a memory 18. Via a display/service unit 16, it is possible, in given cases, directly to perform settings of parameters in the field device. Also, in given cases, measured values can be displayed in the field device.

As has already been mentioned, a direct connection is established between the field device 2 and the mobile device 3 (see FIG. 1). Alternatively, thereto, also a broadcast mode provides an option. This is shown in FIG. 2, where three field devices 2.1 (pH), 2.2 (pH) and 2.3 (conductivity) are connected with a bus 5 and the control room 12. In the broadcast mode, a plurality of field devices 2 transmit to at least one mobile device 3. In this mode, only limited data are dispatched, for example, device type, identification (serial number and the like) and main measured value. These are received by the mobile device 3 and presented in a table, graph and/or the like. An option is that by selecting a field device, a point to point connection is established to such.

Since the field device 2 has a limited energy supply and therewith, most often, also a limited computing power, the visual representation of the service/display menu is calculated on the mobile device 3, i.e. the data are first rendered on the mobile device 3. In such case, just the static data are transmitted from the field device 2, while the actual representation is done by the mobile device 3. Thus, it can also be assured that the data are displayed according to the "look and feel" of the corresponding operating system (iOS, Android, Windows Mobile, Blackberry OS, Bada, etc.) of the mobile device.

Besides the hierarchical navigation via the service/display menu by the user, the arrangement 1 has another type of operation. If parameters and/or measured values assume certain values, additional data are transmitted from the field device 2 to the mobile device 3. These additional data are displayed on the mobile device as a type of "pop-up window", i.e. as a page superimposed on the momentarily visible static and dynamic data. This page is also transmitted in the form of static and dynamic data. This new page sits on top of the currently displayed page, in order to inform the user concerning a certain state. Options here include the representation of critical measured values (a measured value outside of the tolerance range), external parameter changes (for instance, by the control room), etc. In general, these superimposed windows are controlled by generically described conditions, which reference the field device parameters or measured values. Additionally, also a picturing of state machines (finite automata) is another option. Thus, for instance, a menu guided calibration procedure can be presented, which guides the user step by step concerning what to do next. After terminating the state machine or—generally—the superimposed page, the user is returned to the preceding page in the hierarchical service/display menu.

The invention claimed is:

1. A method for providing static data and dynamic data of a service/display menu for a mobile device from a field device of process automation, wherein the field device contains identification data, especially field device type and firmware version, and, associated therewith, a total amount of static data and dynamic data, the method comprising the steps of:

upon query of the mobile device, dynamic data and/or static data are transmitted with a data transmission rate from the field device to the mobile device via a wireless interface, especially via Bluetooth or WLAN, especially according to a standard of the IEEE 802.11 family;

static data required for application, especially for representation, and/or changing of transmitted dynamic data are transmitted from the field device to the mobile device, when the static data corresponding to the identification data are not already present in the mobile device, wherein these static data make up only a portion of the total amount of static data in the field device; and an application, especially a representation, and/or changing of the transmitted dynamic data by the mobile device is enabled with the portion of the static data, wherein these static data are stored in a memory in the mobile device.

2. The method as claimed in claim 1, wherein:
the static data concern the structure, especially hierarchical structure, of a service/display menu embodied for servicing the field device, visibility of the service/display menu, value ranges of parameters, dependencies of parameters, texts of the service/display menu in at least one standard language, especially texts of the service/display menu in English, and/or visibility of parameters, especially as a function of the field device and/or as a function of hardware connected to the field device.

3. The method as claimed in claim 1, wherein:
the dynamic data concern measured values and these are displayed on the mobile device; and/or
the dynamic data concerns parameters and these are displayed on the mobile device, changed and/or transmitted back to the field device for the purpose of changing settings of the field device.

4. The method as claimed in claim 1, wherein:
a point-to-point connection is established between the field device and the mobile device.

5. The method as claimed in claim 1, wherein:
at least the dynamic data are transmitted by means of a binary communication protocol.

6. The method as claimed in claim 1, wherein:
other static data different from the static data already transmitted are transmitted from the field device to the mobile device in the background in the case of a not fully utilized data transmission rate.

7. The method as claimed in claim 1, wherein:
especially after an initial connection between field device and mobile device, other static data of the total amount of static data still lacking are downloaded to the mobile device from another device, especially a network server, via a second wireless interface, especially via a mobile radio connection or per WLAN, especially according to a standard of the IEEE 802.11 family, or via a mobile data carrier, especially a USB flash memory or an SD card.

8. The method as claimed in claim 7, wherein:
expanded media contents, especially texts of the service/display menu in additional languages, operating instructions, photos and/or videos are transferred to the mobile device via the second wireless interface or the mobile data carrier.

9. The method as claimed in claim 1, wherein:
the visual representation of the service/display menu is calculated in the mobile device.

10. The method as claimed in claim 1, wherein:
additional data are sent by the field device to the mobile device and displayed on the mobile device, independently of the static data and dynamic data currently displayed on the mobile device, when parameter and/or measured values assume certain values.

11. A computer program, which has software means, which serve for performing a method as claimed in claim 1, wherein:
the computer program is executed in a field device and/or a mobile device.

12. An arrangement comprising:
at least one field device and at least one mobile device for performing a method as claimed in claim 1.

13. The arrangement as claimed in claim 12, wherein:
the field device has a connection to a fieldbus, especially based on HART, wireless HART, PROFIBUS PA, PROFINET, ModBus, FOUNDATION Fieldbus or EtherNet/IP, and/or the field device has a 4 . . . 20 mA interface.

14. The arrangement as claimed in claim 12, wherein:
the field device is a two conductor device.

15. The arrangement as claimed in claim 12, wherein:
the field device is embodied for use at least according to Ex ib.

* * * * *